US012671216B2

(12) United States Patent
Zhu et al.

(10) Patent No.: US 12,671,216 B2
(45) Date of Patent: Jun. 30, 2026

(54) WALL SOCKET

(71) Applicant: Jiangsu General Protecht Co., Ltd., Suzhou City (CN)

(72) Inventors: Kunlun Zhu, Suzhou (CN); Huaiyin Song, Suzhou (CN); Hua Yan, Suzhou (CN); Wusheng Chen, Suzhou (CN)

(73) Assignee: Jiangsu General Protecht Co., Ltd., Suzhou City (CN)

( * ) Notice: Subject to any disclaimer, the term of this patent is extended or adjusted under 35 U.S.C. 154(b) by 364 days.

(21) Appl. No.: 18/685,483

(22) PCT Filed: Sep. 10, 2021

(86) PCT No.: PCT/CN2021/000183

§ 371 (c)(1),
(2) Date: Feb. 21, 2024

(87) PCT Pub. No.: WO2023/028720

PCT Pub. Date: Mar. 9, 2023

(65) Prior Publication Data

US 2025/0132528 A1 Apr. 24, 2025

(30) Foreign Application Priority Data

Aug. 31, 2021 (CN) ......................... 202122085815.2

(51) Int. Cl.
*H01R 13/74* (2006.01)

(52) U.S. Cl.
CPC .................................... *H01R 13/74* (2013.01)

(58) Field of Classification Search
CPC ........ H01R 13/74; H01R 13/73; H01R 13/10; H01R 13/713; H01R 13/7137; H05K 7/20

(Continued)

(56) References Cited

U.S. PATENT DOCUMENTS 7,736,174 B2 * 6/2010 Bhosale ................. H01R 24/76 439/535
9,774,148 B1 * 9/2017 I ............................. H01R 13/11

(Continued)

FOREIGN PATENT DOCUMENTS

CN 101742866 A 6/2010
CN 204103162 U 1/2015

(Continued)

OTHER PUBLICATIONS

International Search Report and Written Opinion for International Application No. PCT/CN2021/000183, mailed May 25, 2022.

(Continued)

*Primary Examiner* — Tulsidas C Patel
*Assistant Examiner* — Jeffrey Mountain
(74) *Attorney, Agent, or Firm* — Wolf, Greenfield & Sacks, P.C.

(57) ABSTRACT

A wall socket, including: a rear housing, having a box body located on the inner side and a positioning flange located on the outer side and integrated with the box body; and a pressing plate, buckled with the positioning flange of the rear housing by means of a plurality of detachable buckles so as to seal a wiring terminal, a zero wire connecting piece, a live wire connecting piece, a zero wire insertion grip, a live wire insertion grip, and a ground wire insertion grip in the box body of the rear housing. The zero wire connecting piece and/or the live wire connecting piece have a heat dissipation plane attached to the inner wall of the box body of the rear housing, and the outer wall of the box body of the rear housing corresponding to the position of the heat dissipation plane is attached to a wall. Moreover, the detachable buckles of the pressing plate each includes a base portion and a slope-shaped barb located at an overhanging end of the base portion, and a notch penetrating through a (Continued)

slope from the low end to the high end is formed in the middle of the barb. The wall socket can quickly transfer heat to the wall to prevent heat from being accumulated in the wall socket, and is high in disassembly speed and convenient to maintain and replace.

8 Claims, 7 Drawing Sheets

(58) Field of Classification Search
USPC .......................................................... 439/535
See application file for complete search history.

(56) References Cited

U.S. PATENT DOCUMENTS

| | | | | |
|---|---|---|---|---|
| 2016/0254628 | A1* | 9/2016 | Liao | H01R 31/065<br>439/535 |
| 2020/0328586 | A1* | 10/2020 | Eriksen | H02H 1/0061 |

FOREIGN PATENT DOCUMENTS

| | | | |
|---|---|---|---|
| CN | 204103169 | U | 1/2015 |
| CN | 208620174 | U | 3/2019 |
| CN | 209516239 | U | 10/2019 |
| JP | 2000-115956 | A | 4/2000 |
| JP | 2003-149512 | A | 5/2003 |
| JP | H09-260102 | A | 11/2009 |

OTHER PUBLICATIONS

PCT/CN2021/000183, May 25, 2022, International Search Report and Written Opinion.

* cited by examiner

WALL SOCKET

CROSS-REFERENCE TO RELATED APPLICATIONS

This Application is a national stage filing under 35 U.S.C. 371 of International Patent Application Serial No. PCT/CN2021/000183, filed Sep. 10, 2021, which claims priority to Chinese application number 202122085815.2, filed Aug. 31, 2021. The contents of these applications are incorporated herein by reference in their entirety.

TECHNICAL FIELD

The present invention relates to a wall socket.

BACKGROUND

Wall socket is a common power supply equipment in life and plays an important role in life.

However, the existing wall sockets are still not convenient to install and remove, and therefore further structural improvements are required. In addition, as the number and power of the electric equipment increases, the electric heating phenomenon of the wall sockets becomes more and more serious, and it is also necessary to design a new structure to make it easier to discharge its heat.

SUMMARY

The present invention provides a wall socket to solve the above technical problems in the prior art.

In order to achieve the above-mentioned object, the technical solution used in the present invention is:

a wall socket including:

- a rear housing having a box body located on inner side and a positioning flange located on outer side and integrated with the box body; and
- a pressing plate snapped with the positioning flange of the rear housing by means of a number of detachable snapping elements so as to enclose a wiring terminal, a zero-wire connecting piece, a fire-wire connecting piece, a zero-wire plug bush, a fire-wire plug bush, and a ground-wire plug bush in the box body of the rear housing;
- wherein the zero-wire connecting piece and/or the fire-wire connecting piece have a heat dissipation plane attached to an inner wall of the box body of the rear housing, and an outer wall of the box body of the rear housing corresponding to the position of the heat dissipation plane is attached to a wall.

The wall socket, wherein the wiring terminal includes a zero-wire terminal, a fire-wire terminal, and a ground-wire terminal;

- one end of the zero-wire connecting piece is electrically connected to the zero-wire terminal, and one end of the fire-wire connecting piece is electrically connected to the fire-wire terminal;
- the zero-wire plug bush is electrically connected to the other end of the zero-wire connecting piece, and the fire-wire plug bush is electrically connected to the other end of the fire-wire connecting piece;
- the ground-wire plug bush is electrically connected to the ground-wire terminal.

The wall socket, wherein an insulating support is arranged at a central position of the zero-wire plug bush, the fire-wire plug bush, and the ground-wire plug bush, and electrically insulates the zero-wire plug bush, the fire-wire plug bush, and the ground-wire plug bush from each other.

The wall socket, further comprising a cover plate arranged on outside of the pressing plate and detachably connected to the pressing plate by means of a number of hooks, a surface of the cover plate having apertures for pins of an electrical plug to pass through.

The wall socket, further comprising a panel arranged outside of the positioning flange of the rear housing and the cover plate and detachably connected to the positioning flange of the rear housing via a snap-fit structure, a surface of the panel having apertures corresponding to those of the cover plate.

The wall socket, wherein the detachable snapping elements of the pressing plate each comprises a base portion and a slope-shaped barb located at an overhanging end of the base portion, and a notch extending from a low end to a high end of the slope is formed in a middle portion of the barb.

The wall socket, wherein the positioning flange of the rear housing is provided with a guide slope corresponding to the position of the notch.

The wall socket, wherein the zero-wire connecting piece and/or the fire-wire connecting piece are fixedly connected to the box body by means of embedding.

Compared with the prior art, the present invention using the above technical solution has advantages in that: the wall socket can quickly transfer heat to the wall to prevent heat from being accumulated in the wall socket, and is quick to disassemble and convenient to maintain and replace.

Figure 1:
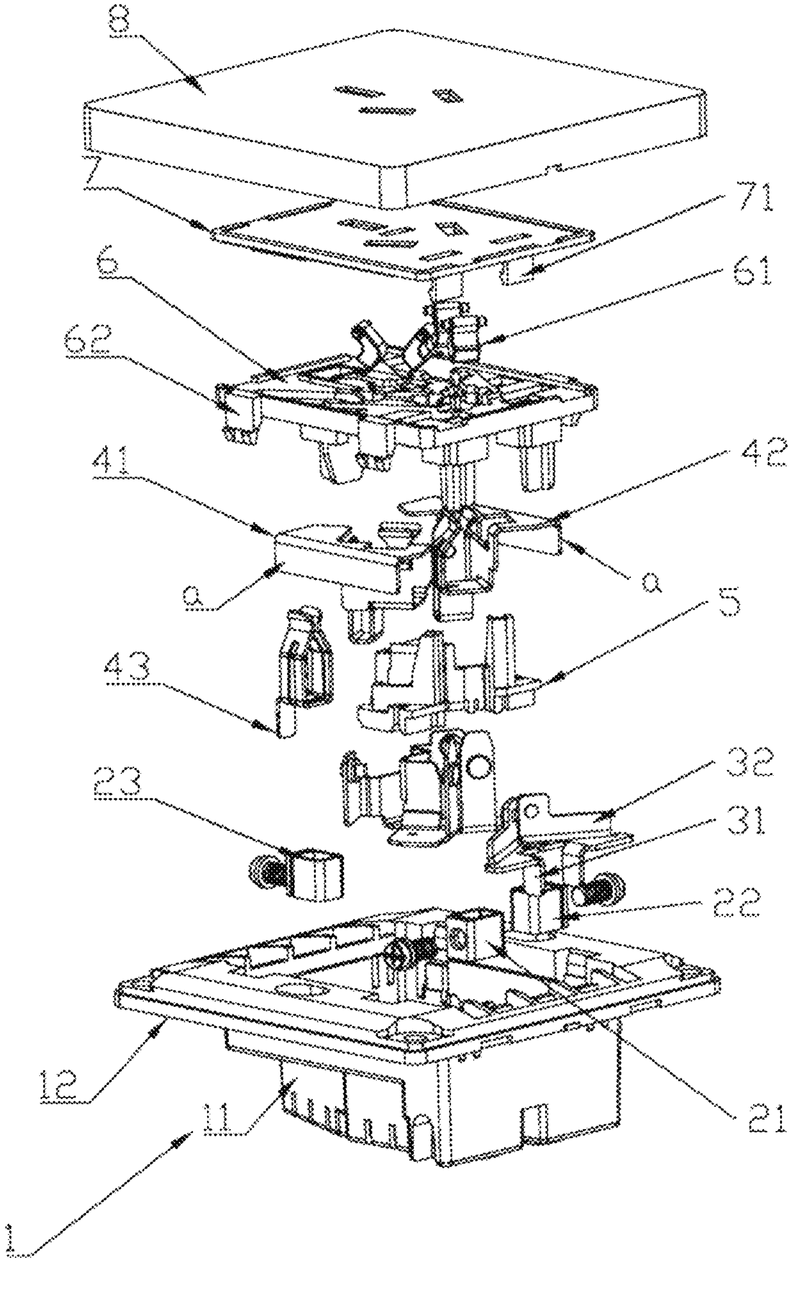
FIG. 1 is an exploded view of a wall socket according to the present invention.
Figure 2:
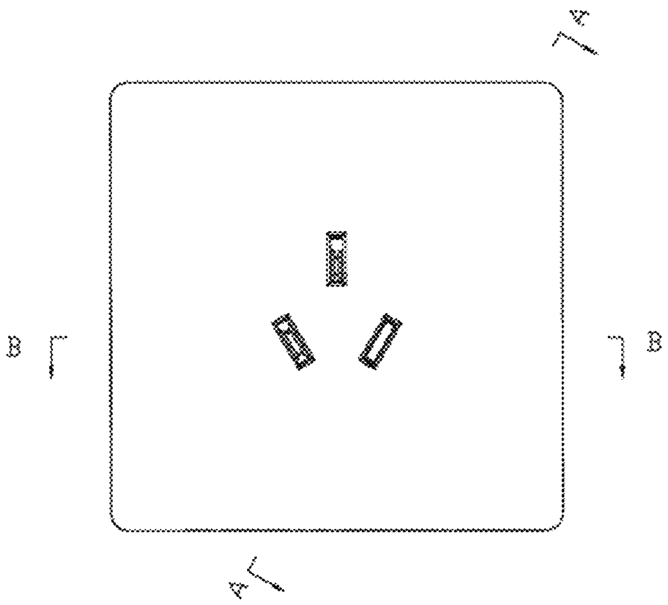
FIG. 2 is a schematic plan view of a wall socket.
Figure 3:
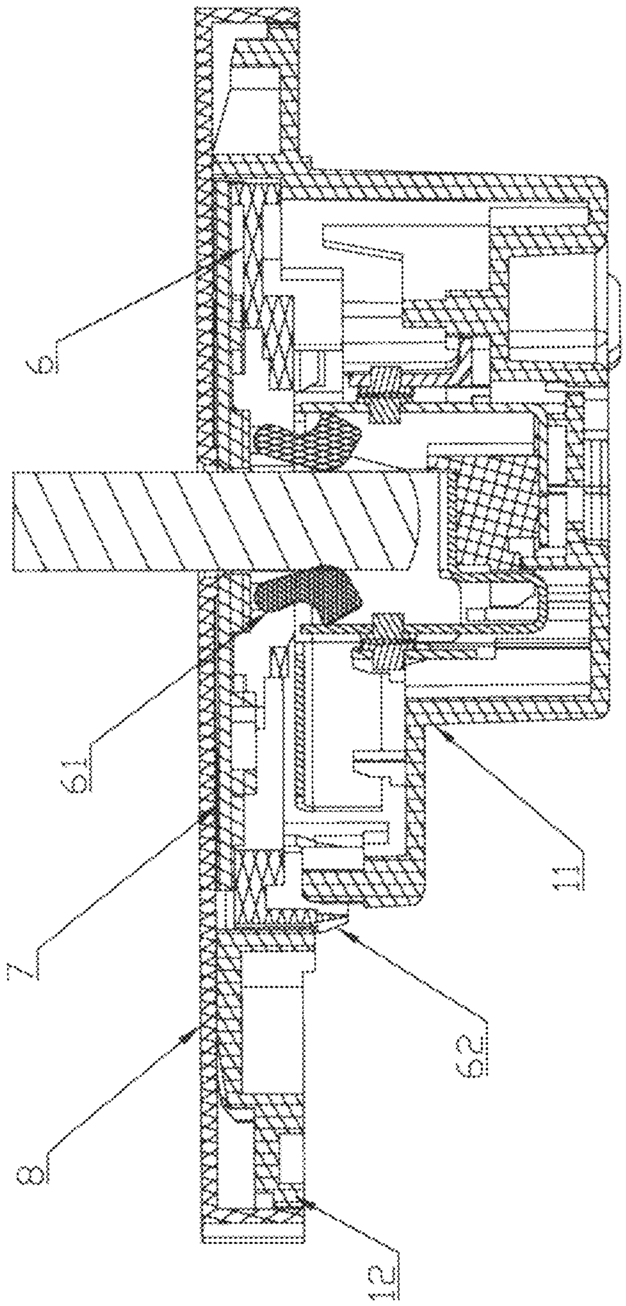
FIG. 3 is a sectional view along A-A of FIG. 2.

Reference numerals: rear housing 1; box body 11; positioning flange 12; guide slope 121; zero-wire terminal 21; fire-wire terminal 22; ground-wire terminal 23; zero-wire connecting piece 31; fire-wire connecting piece 32; zero-wire plug bush 41; fire-wire plug bush 42; ground-wire plug bush 43; insulating support 5; pressing plate 6; rotary block 61; detachable snapping element 62; base portion 621; barb 622; notch 623; cover plate 7; hook 71; panel 8; heat dissipation plane a; wall b.

DETAILED DESCRIPTION

Figure 8:
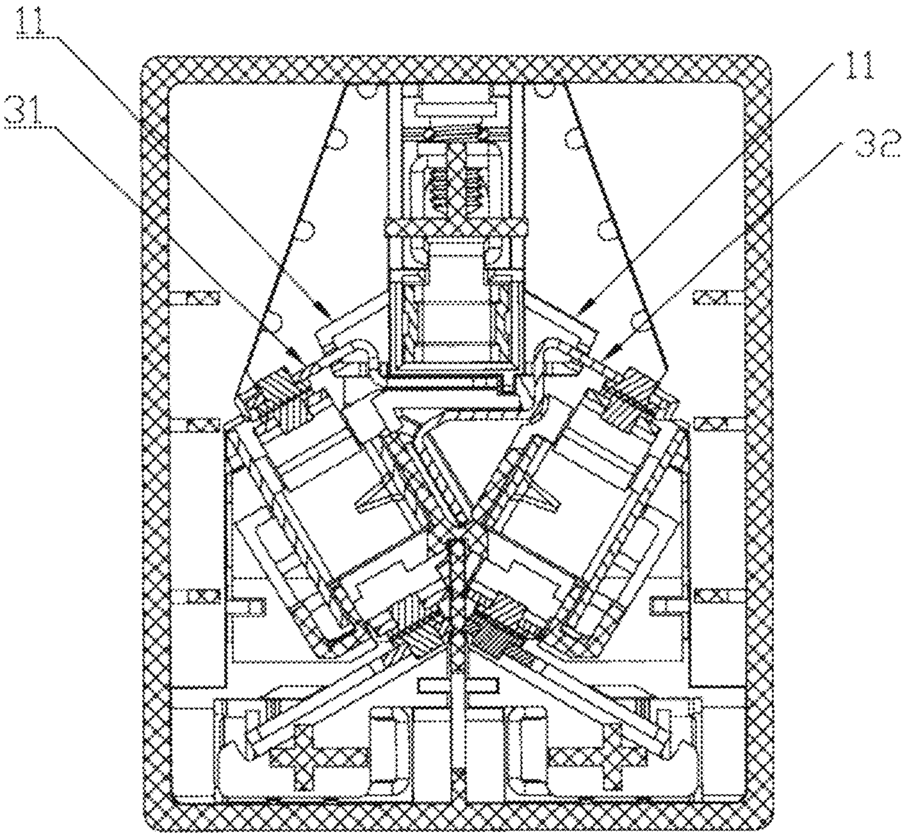
FIG. 8 is a schematic diagram showing that the zero-wire (fire-wire) connecting piece is fixedly connected to the box body.

As shown in FIGS. 1-5, the present invention provides a wall socket including:

- a rear housing 1 having a box body 11 located on inner side and a positioning flange 12 located on outer side and integrated with the box body 11; and
- a wiring terminal fixed in the box body 11 of the rear housing 1, including a zero-wire terminal 21, a fire line terminal 22 and a ground line terminal 23;

a zero-wire connecting piece 31 and a fire-wire connecting piece 32, as shown in FIG. 8, fixed in the box body 11 of the rear housing 1 by means of embedding, and one end of the zero-wire connecting piece electrically connected to the zero-wire terminal 21 and one end of the fire-wire connecting piece electrically connected to the fire-wire terminal 22;

a zero-wire plug bush 41 electrically connected to the other end of the zero-wire connecting piece 31 and a fire-wire plug bush 42 electrically connected to the other end of the fire-wire connecting piece 32;

a ground-wire plug bush 43 electrically connected to the ground-wire terminal 23;

an insulating support 5 arranged at a central position of the zero-wire plug bush 41, the fire-wire plug bush 42 and the ground-wire plug bush 43, and used for electrically insulating and separating the zero-wire plug bush 41, the fire-wire plug bush 42 and the ground-wire plug bush 43 from each other;

a pressing plate 6 provided with a rotary block 61 and snapped with the positioning flange 12 of the rear housing 1 by means of a number of detachable snapping elements 62 to enclose the wiring terminal, the zero-wire connecting piece 31, the fire-wire connecting piece 32, the zero-wire plug bush 41, the fire-wire plug bush 42, the ground-wire plug bush 43 and the insulating support 5 in the box body 11 of the rear housing 1;

a cover plate 7 arranged on outside of the pressing plate 6 and detachably connected to the pressing plate 6 by means of a number of hooks 71, the surface of the cover plate having apertures for pins of an electrical plug to pass through;

a panel 8 arranged outside of the positioning flange 12 of the rear housing 1 and the cover plate 7, and detachably connected to the positioning flange 12 of the rear housing 1 via a snap-fit structure, and a surface of the panel having apertures corresponding to those of the cover plate 7.

Figure 4:
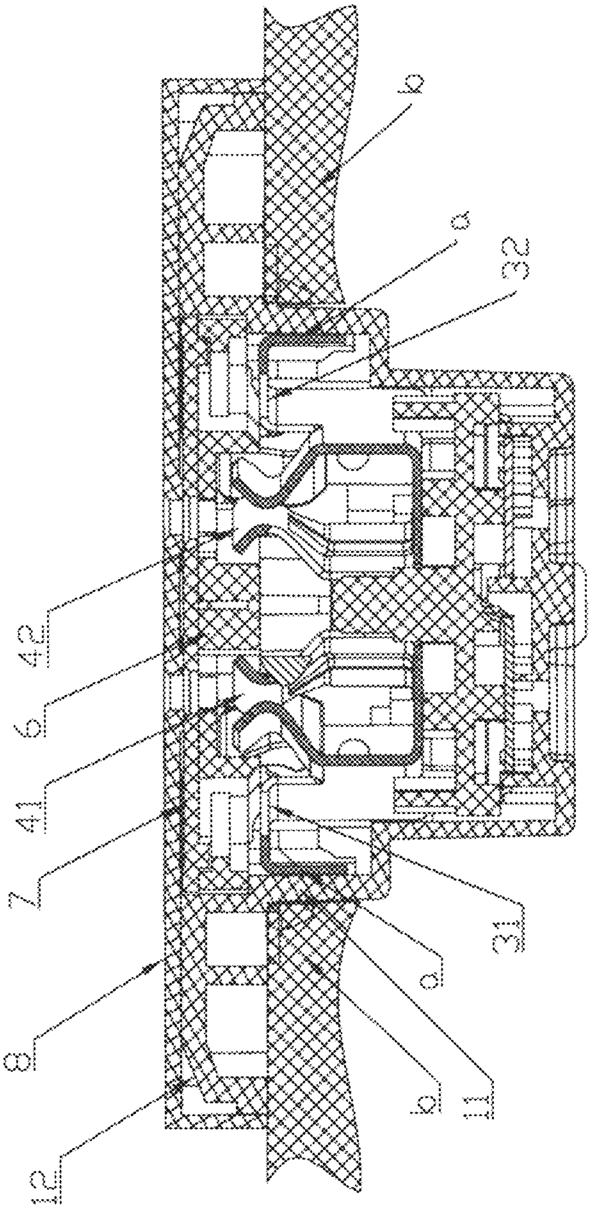
FIG. 4 is a sectional view along B-B of FIG. 2.
Figure 7:
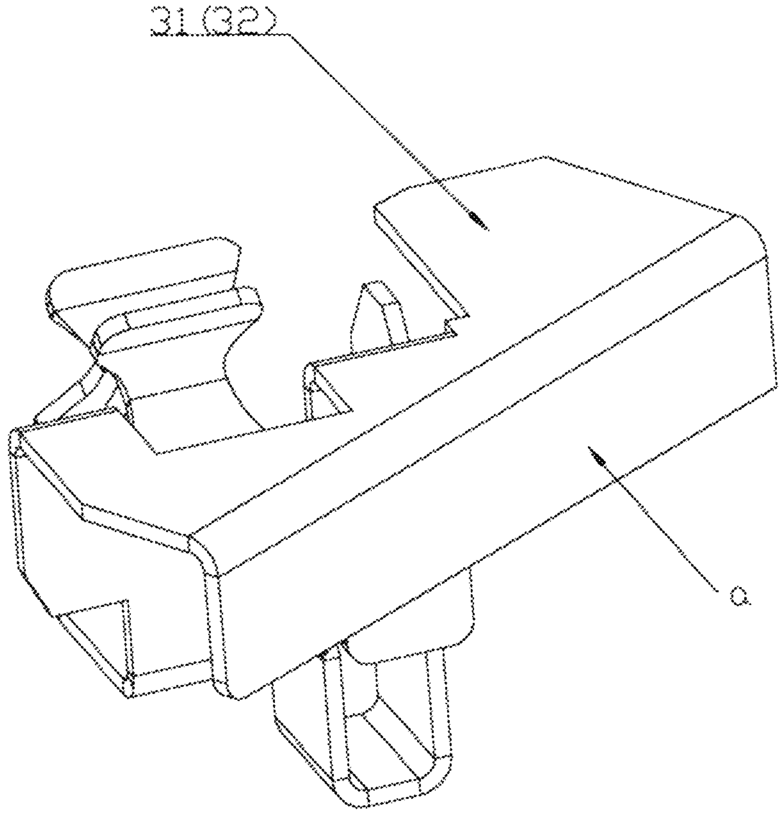
FIG. 7 is a perspective view of a zero-wire (fire-wire) connecting piece.

The main features of the present invention compared with the prior art are:

As shown in FIGS. 4 and 7, the zero-wire connecting piece 31 and the fire line connecting piece 32 have heat dissipation planes a adhered to an inner wall of the box body 11 of the rear housing 1, and an outer wall of the box body 11 of the rear housing 1 corresponding to the position of the heat dissipation planes a is adhered to a wall b, so that when the wall socket is used at a relatively high electric power or a relatively long time which causes a relatively large electric heat generation, the high temperature generated by the zero-wire connecting piece 31 and the fire-wire connecting piece 32 will be quickly transmitted to the wall b via the box body 11 through contact heat transfer, and thus the temperature thereof will be rapidly reduced, avoiding a safety hazard caused by a continuously high temperature.

Figure 5:
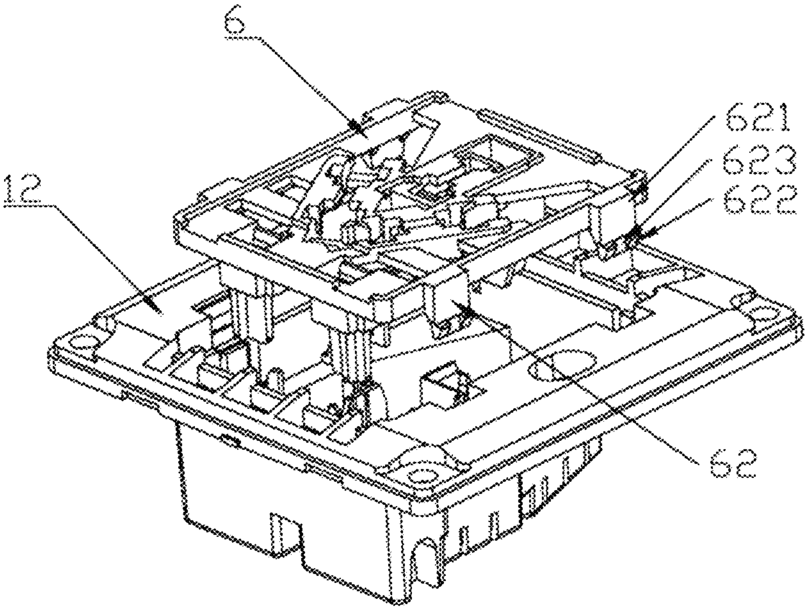
FIG. 5 is an exploded view showing the coupling relationship between the pressing plate and the rear housing.
Figure 6:
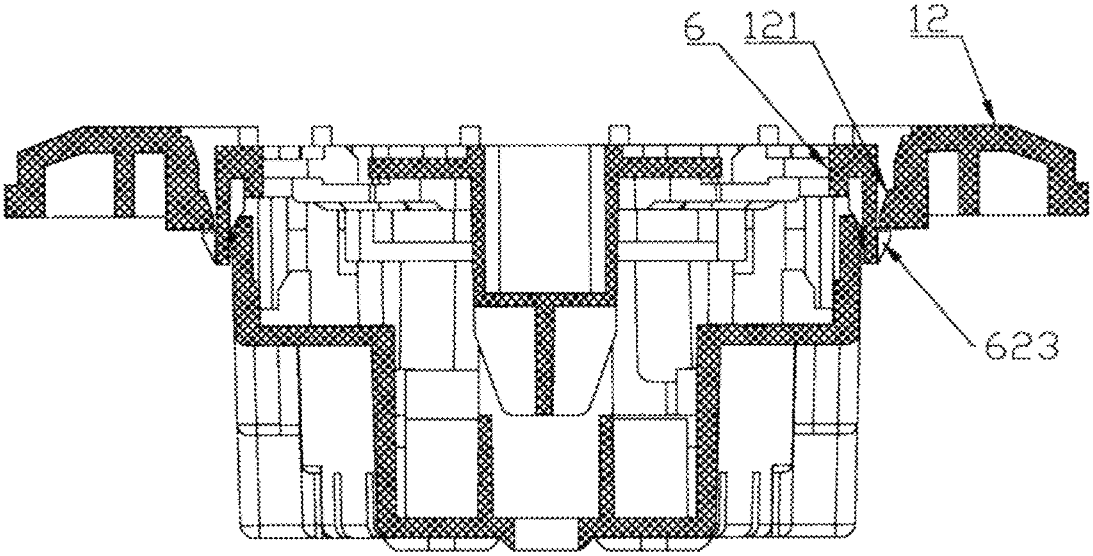
FIG. 6 is a sectional view showing the coupling relationship between the pressing plate and the rear housing.

As shown in FIGS. 5 and 6, the detachable snapping element 62 of the pressing plate 6 includes a base portion 621 and a slope-shaped barb 622 located at an overhanging end of the base portion 621. A notch 623 extending from a low end to a high end of the slope is formed in a middle portion of the barb 622. When it is desired to remove the pressing plate 6 snapped onto the positioning flange 12 of the rear housing 1, a driver (or tweezers, needles, etc.) can be inserted inwardly from the notch 623 and then the driver can be pulled, as with a crowbar, to disengage the slope-shaped barbs 622 from the positioning flange 12 of the rear housing 1 to facilitate removal of the pressing plate 6. As shown in FIG. 6, in order to easily insert the driver inwardly from the notch 623, the positioning flange 12 of the rear housing 1 is provided with a guide slope 121 corresponding to the position of the notch 623.

In summary, the wall socket can quickly transfer heat to the wall to prevent heat from being accumulated in the wall socket, and is quick to disassemble and convenient to maintain and replace.

The above description is intended to be illustrative, and not restrictive, and it will be understood by a person skilled in the art that various modifications, changes, and equivalents may be made without departing from the spirit and scope of the invention as defined by the appended claims.

The invention claimed is:

1. A wall socket, comprising:

a rear housing having a box body located on an inner side and a positioning flange located on an outer side and integrated with the box body; and a pressing plate snapped with the positioning flange of the rear housing by means of a number of detachable snapping elements so as to enclose a wiring terminal, a zero-wire connecting piece, a fire-wire connecting piece, a zero-wire plug bush, a fire-wire plug bush, and a ground-wire plug bush in the box body of the rear housing;

wherein the zero-wire connecting piece and/or the fire-wire connecting piece have a heat dissipation plane attached to an inner wall of the box body of the rear housing, and an outer wall of the box body of the rear housing corresponding to the position of the heat dissipation plane is attached to a wall.

2. The wall socket according to claim 1, wherein the wiring terminal comprises a zero-wire terminal, a fire-wire terminal, and a ground-wire terminal;

one end of the zero-wire connecting piece is electrically connected to the zero-wire terminal, and one end of the fire-wire connecting piece is electrically connected to the fire-wire terminal;

the zero-wire plug bush is electrically connected to the other end of the zero-wire connecting piece, and the fire-wire plug bush is electrically connected to the other end of the fire-wire connecting piece;

the ground-wire plug bush is electrically connected to the ground-wire terminal.

3. The wall socket according to claim 2, wherein an insulating support is arranged at a central position of the zero-wire plug bush, the fire-wire plug bush, and the ground-wire plug bush, and electrically insulates the zero-wire plug bush, the fire-wire plug bush, and the ground-wire plug bush from each other.

4. The wall socket according to claim 1, further comprising a cover plate arranged on the outside of the pressing plate and detachably connected to the pressing plate by means of a number of hooks, a surface of the cover plate having apertures for pins of an electrical plug to pass through.

5. The wall socket according to claim 4, further comprising a panel arranged outside of the positioning flange of the rear housing and the cover plate and detachably connected to the positioning flange of the rear housing via a snap-fit structure, a surface of the panel having apertures corresponding to those of the cover plate.

6. The wall socket according to claim 1, wherein the detachable snapping elements of the pressing plate each comprises a base portion and a slope-shaped barb located at an overhanging end of the base portion, and a notch extending from a low end to a high end of the slope is formed in a middle portion of the barb.

7. The wall socket according to claim 6, wherein the positioning flange of the rear housing is provided with a guide slope corresponding to the position of the notch.

8. The wall socket according to claim 1, wherein the zero-wire connecting piece and/or the fire-wire connecting piece are fixedly connected to the box body by means of embedding.

* * * * *